US006812185B2

(12) United States Patent
Fischer et al.

(10) Patent No.: US 6,812,185 B2
(45) Date of Patent: Nov. 2, 2004

(54) PREPARATION OF A METAL-CONTAINING SUPPORTED CATALYST OR A SUPPORTED CATALYST COMPONENT BY IMPREGNATION OF A SUPPORT MATERIAL

(75) Inventors: David Fischer, Breunigweiler (DE); Wolfgang Bidell, Mutterstadt (DE); Ulrich Moll, Lambesc (DE); Joachim Rösch, Ludwigshafen (DE); Franz Langhauser, Ruppertsberg (DE); Roland Hingmann, Ladenburg (DE); Heike Gregorius, Bubach (DE); Carsten Süling, Frankenthal (DE); Günther Schweier, Friedelsheim (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 10/402,301

(22) Filed: Jul. 30, 2003

(65) Prior Publication Data
US 2003/0236164 A1 Dec. 25, 2003

Related U.S. Application Data

(63) Continuation of application No. 09/720,881, filed as application No. PCT/EP99/04906 on Jul. 13, 1999, now Pat. No. 6,589,905.

(30) Foreign Application Priority Data

Jul. 23, 1998 (DE) .......................................... 198 33 170

(51) Int. Cl.[7] .............................. C08F 4/64; B01J 23/00
(52) U.S. Cl. ...................... 502/120; 502/155; 502/104; 526/129; 526/130; 526/160; 526/165; 526/172
(58) Field of Search ................................ 502/120, 155, 502/104; 526/129, 130, 160, 165, 172

(56) References Cited

U.S. PATENT DOCUMENTS

| 3,882,096 A | 5/1975 | Shida .......................... 260/94 |
| 4,072,630 A | 2/1978 | Douglas |
| 4,128,500 A | 12/1978 | Hwang ........................ 252/430 |
| 4,224,428 A | 9/1980 | Kirch .......................... 526/106 |
| 5,624,877 A | 4/1997 | Bergmeister et al. ........ 502/120 |
| 5,625,015 A | 4/1997 | Brinen et al. ................ 526/120 |

FOREIGN PATENT DOCUMENTS

| EP | 295312 | 12/1988 |
| WO | 94/14856 | 7/1994 |
| WO | 94/28034 | 12/1994 |
| WO | 96/16093 | 5/1996 |
| WO | 98/01481 | 1/1998 |

OTHER PUBLICATIONS

J.M.S.—Rev.Macr. Chem. Phys., C34 (3), 439–514 (1994).

Primary Examiner—Caixia Lu
(74) Attorney, Agent, or Firm—Keil & Weinkauf

(57) ABSTRACT

In a process for preparing a metal-containing supported catalyst or a metal-containing supported catalyst component by impregnation of a support material with an impregnation solution comprising the metal component, the impregnation solution flows through the support material.

15 Claims, 2 Drawing Sheets

PREPARATION OF A METAL-CONTAINING SUPPORTED CATALYST OR A SUPPORTED CATALYST COMPONENT BY IMPREGNATION OF A SUPPORT MATERIAL

This is a continuation application of Ser. No. 09/720,881, filed on Jan. 2, 2001 now U.S. Pat. No. 6,589,905, which is a national stage application of PCT/EP 99/04906, filed Jul. 13, 1999.

The present invention relates to a process for preparing a metal-containing supported catalyst or a supported catalyst component by impregnation of a support material.

The present invention also relates to a metal-containing supported catalyst or a metal-containing supported catalyst component obtainable by this process, a process for preparing polymers based on monomers having a C-C double bond and/or C-C triple bond, and also to the use of the metal-containing catalyst for forming carbon-carbon or carbon-heteroatom covalent bonds.

Supported catalysts are known and are widely used in many areas of industry. For example, they are used in processes for preparing low molecular weight organic chemicals and intermediates.

A further important application area for metal-containing supported catalysts is the preparation of polymers, in particular polyolefins and styrene polymers. Such polymerizations are preferably carried out in the gas phase or in suspension. The catalysts used are, for example, Ziegler catalysts or metallocene catalysts. For the purposes of the present invention, metallocene catalysts are catalysts comprising a metal complex, preferably a transition metal complex, bearing at least one ligand which in turn contains a cyclopentadienyl type structural unit. Examples of such bridged and unbridged ligands are substituted and unsubstituted cyclopentadienyl ligands, substituted and unsubstituted indenyl ligands or substituted or unsubstituted fluorenyl ligands. Metal complexes containing such ligands are known and are described, for example, in J. Macromol Sci—Rev. Macromol Chem. Phys., C34, pages 439–514 (1994).

Processes for preparing metal-containing supported catalysts are known. Efforts are made here to ensure that a) all suport particles are laden with the transition metal,
b) there are no differences in concentration of the metal component within the loaded support particles and
c) all particles have the same concentration of metal component (mg of metal/quantity of particle).

According to the present state of knowledge, such an ideal catalyst should be well suited, for example, to polymerizing olefins since it displays, inter alia, no sintering together of the polymer particles in the reactor (lump formation) and no overheating of the catalyst particles resulting in deactivation of the catalyst.

According to a known method, supported metallocene catalysts can, for example, be obtained by combining a metallocene-containing solution with the support material, stirring the suspension and removing the solvent under reduced pressure (WO-A 94/28034). Here, the solution volume of the impregnation solution is much greater than the pore volume of the untreated support material, so that a readily stirrable suspension is obtained. Although the metallocene component can be completely applied to the support in this method, the catalyst leads, particularly at high loadings, to difficulties in the polymerization process, for example lump formation.

In a further process for applying metallocene catalysts to supports, the metallocene impregnation solution is combined with the support material with the volume of the impregnation solution being no more than the pore volume of the support material. This gives a paste-like mass from which the solvent is removed (WO-A 94/14856). A disadvantage of this process is that the loading of the support material with sparingly soluble metallocenes is unsatisfactory because of the small amount of solvent, the productivity of the catalyst is low and the economics of the polymerization process are still unsatisfactory.

In a third method of applying the catalyst to a support, the metallocene dissolved in a good solvent is precipitated by means of a poor solvent in the presence of the support material and thus precipitated on the surface of the support material and in its pores (EP-A 0 295 312, WO 98/01481). A disadvantage of this process is that large amounts of precipitation liquids (non-solvents) are required in order to deposit the metallocene component on and in the support material. For the preparation of catalysts, the advice given for industrial purposes is to restrict the amount of non-solvent, thereby leaving valuable metallocene component in solution and therefore losing it from the supported catalyst. This method is unsatisfactory in respect of the space-time yield of catalyst and the economics.

DETAILED DESCRIPTION OF THE INVENTION

Figure 1:
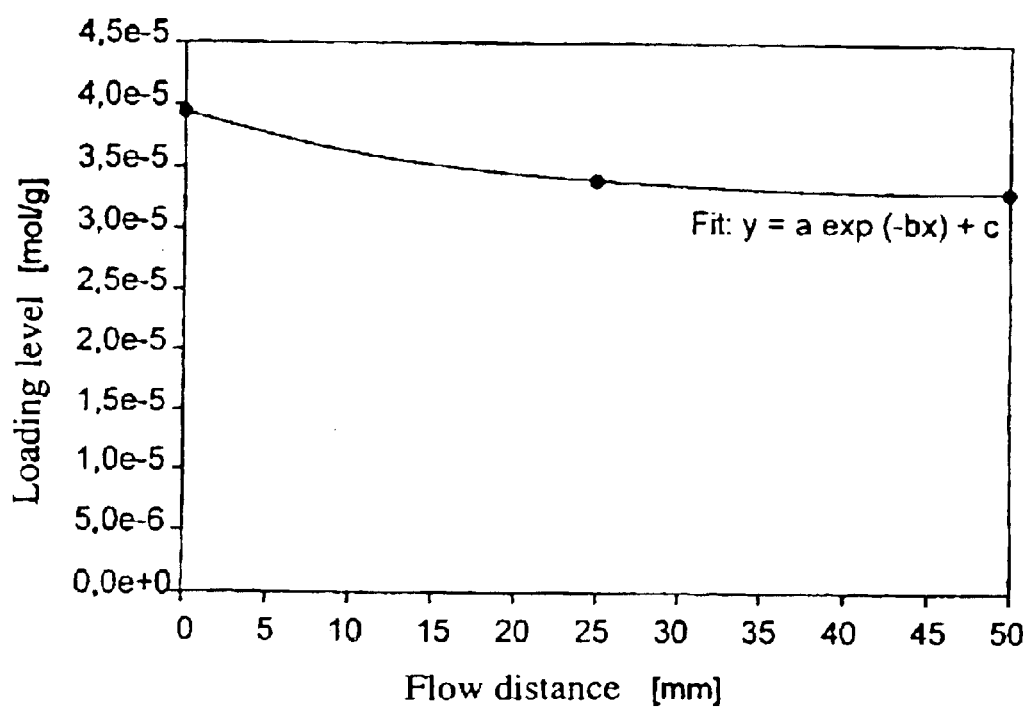
FIG. 1 shows the loading level as a function of flow distance for the supported catalyst of Example 10.

It is an object of the present invention to provide a more economical process for preparing metal-containing supported catalysts, in particular metallocene catalysts, which gives high space-time yields. The process should be universally applicable, i.e. metallocene complexes having very different solubilities, in particular relatively sparingly soluble metallocene complexes, should still lead to a high loading in the supported catalyst. Furthermore, the catalyst, in particular the metallocene catalyst, should have the metal component distributed over the volume of the support particles in such a way that it gives high catalyst productivities (g of polymer/g of catalyst solid) together with a good polymer morphology (virtually no formation of lumps and fines). In addition, an improved catalyst, improved polymerization processes and synthetic processes for low molecular weight organic compounds using the improved catalyst are to be made available.

We have found that this object is achieved by a process for preparing a metal-containing supported catalyst or a metal-containing supported catalyst component by impregnation of a support material with an impregnation solution comprising the metal component, wherein the impregnation solution flows through the support material, a metal-containing supported catalyst obtainable by this process, a process for preparing polymers based on monomers having a C-C double bond and/or a C-C triple bond by polymerization of these monomers in the presence of a metal-containing supported catalyst obtainable by the process of the present invention and the use of a metal-containing supported catalyst obtainable by the process of the present invention for forming carbon-carbon covalent bonds or carbon-heteroatom covalent bonds.

Possible metal components for the process or catalyst of the present invention are in principle all main group or transition metal compounds which are virtually completely soluble and/or finely dispersible in organic solvents or water or mixtures thereof.

Well suited main group metal compounds are, for example, halides, sulfates, nitrates, $C_1$–$C_{10}$-alkyls, $C_6$–$C_{20}$-aryls, $C_1$–$C_{10}$-alkoxides, $C_6$–$C_{20}$-aryloxides of metals or semimetals of the 1st to 5th main groups of the Periodic Table.

Well suited transition metal compounds are, for example, halides, sulfates, nitrates, $C_1$–$C_{10}$-alkyls, $C_6$–$C_{20}$-aryls, $C_1$–$C_{10}$-alkoxides, $C_6$–$C_{20}$-aryloxides of the transition metals.

Preference is given to using organometallic compounds of transition metals, for example compounds A), as metal component.

Well suited transition metal compounds A) are, for example: transition metal complexes including a ligand of the formulae F-I to F-IV

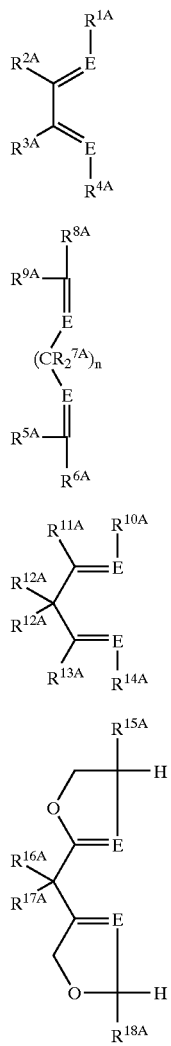

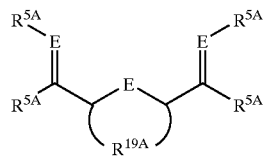

where the transition metal is selected from among the elements Ti, Zr, Hf, Sc, V, Nb, Ta, Cr, Mo, W, Fe, Co, Ni, Pd, Pt or an element of the rare earth metals. Preference is given to compounds having nickel, iron, cobalt or palladium as central metal.

E is an element of group 15 of the Periodic Table of the Elements (5th main group), preferably N or P, particularly preferably N. The two atoms E in a molecule can be identical or different.

The radicals $R^{1A}$ to $R^{19A}$, which can be identical or different, are the following groups:

$R^{1A}$ and $R^{4A}$: independently of one another, hydrocarbon radicals or substituted hydrocarbon radicals, preferably hydrocarbon radicals in which the carbon atom adjacent to the element E is bound to at least two carbon atoms;

$R^{2A}$ and $R^{3A}$: independently of one another, hydrogen, hydrocarbon radicals or substituted hydrocarbon radicals, where $R^{2A}$ and $R^{3A}$ may also together form a ring system in which one or more heteroatoms may also be present;

$R^{6A}$: a hydrocarbon radical or substituted hydrocarbon radical;

$R^{5A}$: hydrogen, a hydrocarbon radical or substitued hydrocarbon radical;

$R^{6A}$ and $R^{5A}$ may also together form a ring system;

$R^{5A}$: a hydrocarbon radical or substituted hydrocarbon radical;

$R^{9A}$: hydrogen, a hydrocarbon radical or substituted hydrocarbon radical;

$R^{8A}$ and $R^{9A}$ may also together form a ring system;

$R^{7A}$: independently of one another, hydrogen, hydrocarbon radicals or substituted hydrocarbon radicals, where two $R^{7A}$ can also together form a ring system, and n is an integer from 1 to 4, preferably 2 or 3;

$R^{10A}$ and $R^{14A}$: independently of one another, hydrogen, hydrocarbon radicals or substituted hydrocarbon radicals;

$R^{11A}$, $R^{12A}$ and $R^{13A}$: independently of one another, hydrogen, hydrocarbon radicals or substituted hydrocarbon radicals, where two or more radicals $R^{11A}$, $R^{12A}$ and $R^{13A}$ may also together form a ring system;

$R^{15A}$ and $R^{18A}$: independently of one another, hydrogen, hydrocarbon radicals or substituted hydrocarbon radicals;

$R^{16A}$ and $R^{17A}$: independently of one another, hydrogen, hydrocarbon radicals or substituted hydrocarbon radicals;

$R^{19A}$: an organic radical which can form a 5- to 7-membered substituted or unsubstituted, in particular unsaturated or aromatic, heterocyclic ring system.

Particularly useful compounds F-I to F-IV are, for example:

di(2,6-di-i-propylphenyl)-2,3-dimethyldiazabutadienepalladium dichloride
di(di-i-propylphenyl)-2,3-dimethyldiazabutadienenickel dichloride
di(2,6-di-i-propylphenyl)dimethyldiazabutadiene(dimethyl) palladium
di(2,6-di-i-propylphenyl)-2,3-dimethyldiazabutadiene (dimethyl)nickel
di(2,6-dimethylphenyl)-2,3-dimethyldiazabutadienepalladium dichloride
di(2,6-dimethylphenyl)-2,3-dimethyldiazabutadienenickel dichloride
di(2,6-dimethylphenyl)-2,3-dimethyldiazabutadiene (dimethyl)palladium
di(2,6-dimethylphenyl)-2,3-dimethyldiazabutadiene (dimethyl)nickel
di(2-methylphenyl)-2,3-dimethyldiazabutadienepalladium dichloride
di(2-methylphenyl)-2,3-dimethyldiazabutadienenickel dichloride
di(2-methylphenyl)-2,3-dimethyldiazabutadiene(dimethyl) palladium
di(2-methylphenyl)-2,3-dimethyldiazabutadiene(dimethyl) nickel
diphenyl-2,3-dimethyldiazabutadienepalladium dichloride
diphenyl-2,3-dimethyldiazabutadienenickel dichloride
diphenyl-2,3-dimethyldiazabutadiene(dimethyl)palladium
diphenyl-2,3-dimethyldiazabutadiene(dimethyl)nickel
di(2,6-dimethylphenyl)azanaphthenepalladium dichloride
di(2,6-dimethylphenyl)azanaphthenenickel dichloride
di(2,6-dimethylphenyl)azanaphthene(dimethyl)palladium
di(2,6-dimethylphenyl)azanaphthene(dimethyl)nickel
1,1'-bipyridylpalladium dichloride
1,1'-bipyridylnickel dichloride
1,1'-bipyridyl(dimethyl)palladium
1,1'-bipyridyl(dimethyl)nickel Particularly useful compounds F-V are those which are described in J. Am. Chem. Soc. 120, p. 4049 ff. (1998) and J. Chem. Soc., Chem. Commun. 1998, 849.

Further transition metal compounds A) which are particularly well suited are ones including at least one cyclopentadienyl type ligand, which are generally referred to as metallocene complexes (two or more cyclopentadienyl type ligands) or semisandwich complexes (one cyclopentadienyl type ligand). Particularly suitable complexes are those of the formula

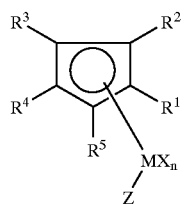

I where the substitutents have the following meanings:
M is titanium, zirconium, hafnium, vanadium, niobium or tantalum or an element of transition group III of the Periodic Table and the lanthanides,
X is fluorine, chlorine, bromine, iodine, hydrogen, $C_1$–$C_{10}$-alkyl, $C_6$–$C_{15}$-aryl, alkylaryl having from 1 to 10 carbon atoms in the alkyl radical and from 6 to 20 carbon atoms in the aryl radical, —$OR^6$ or —$NR^6R^7$, n is an integer from 1 to 3, where n corresponds to the valence of M minus 2, where
$R^6$ and $R^7$ are $C_1$–$C_{10}$-alkyl, $C_6$–$C_{15}$-aryl, alkylaryl, arylalkyl, fluoroalkyl or fluoroaryl each having from 1 to 10 carbon atoms in the alkyl radical and from 6 to 20 carbon atoms in the aryl radical,
$R^1$ to $R^5$ are hydrogen, $C_1$–$C_{10}$-alkyl, 5- to 7-membered cycloalkyl which may in turn bear a $C_1$–$C_{10}$-alkyl group as substituent, $C_6$–$C_{15}$-aryl or arylalkyl, where two adjacent radicals may also together form a saturated or unsaturated cyclic group having from 4 to 15 carbon atoms, or $Si(R^8)_3$ where
$R^8$ is $C_1$–$C_{10}$-alkyl, $C_3$–$C_{10}$-cycloalkyl or $C_6$–$C_{15}$-aryl,
Z is X or

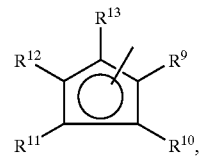

where the radicals
$R^9$ to $R^{13}$ are hydrogen, $C_1$–$C_{10}$-alkyl, 5- to 7-membered cycloalkyl which may in turn bear a $C_1$–$C_{10}$-alkyl group as substituent, $C_6$–$C_{15}$-aryl or arylalkyl, where two adjacent radicals may also together form a saturated or unsaturated cyclic group having from 4 to 15 carbon atoms, or $Si(R^{14})_3$ where
$R^{14}$ is $C_1$–$C_{10}$-alkyl, $C_6$–$C_{15}$-aryl or $C_3$–$C_{10}$-cycloalkyl,
or the radicals $R^4$ and Z together form an —$R^{15}$—A— group, where

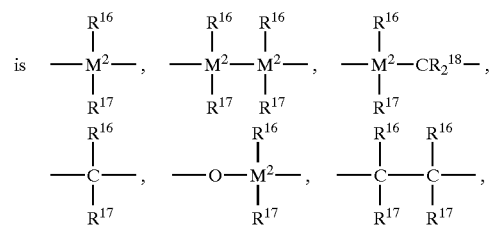

=$BR^{16}$, =$AlR^{16}$, —Ge—, —Sn—, —O—, —S—, =SO, =$SO_2$, =$NR^{16}$, =CO, =$PR^{16}$ or =$P(O)R^{16}$, where
$R^{16}$, $R^{17}$ and $R^{18}$ are identical or different and are each a hydrogen atom, a halogen atom, a $C_1$–$C_{10}$-alkyl group, a $C_1$–$C_{10}$-fluoroalkyl group, a $C_6$–$C_{10}$-fluoroaryl group, a $C_6$–$C_{10}$-aryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group or two adjacent radicals together with the atoms connecting them form a ring, and
$M^2$ is silicon, germanium or tin,
A is —O—, —S—,

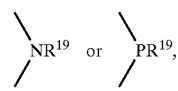

where
$R^{19}$ is $C_1$–$C_{10}$-alkyl, $C_6$–$C_{15}$-aryl, $C_3$–$C_{10}$-cycloalkyl, alkylaryl or $Si(R^{20})_3$, where $R^{20}$ is hydrogen, $C_1$–$C_{10}$-alkyl, $C_6$–$C_{15}$-aryl, which may in turn bear $C_1$–$C_4$-alkyl groups as substituents, or $C_3$–$C_{10}$-cycloalkyl or the radicals $R^4$ and $R^{12}$ together form an —$R^{15}$— group.

Among the metallocene complexes of the formula I, preference is given to

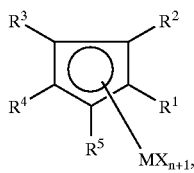

Ia

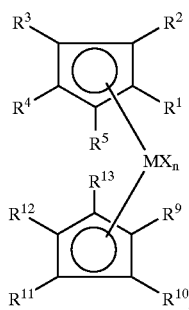

Ib

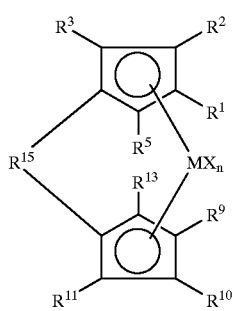

Ic

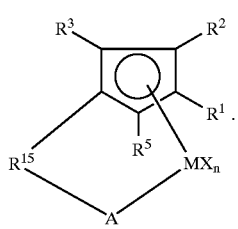

and

Id

The radicals X can be identical or different; they are preferably identical.

Among the compounds of the formula Ia, particular preference is given to those in which
 M is titanium, zirconium or hafnium,
 X is chlorine, $C_1$–$C_4$-alkyl or phenyl,
 n is the 2 and
 $R^1$ to $R^5$ are hydrogen or $C_1$–$C_4$-alkyl.

Among the compounds of the formula Ib, preference is given to those in which
 M is titanium, zirconium or hafnium,
 X is chlorine, $C_1$–$C_4$-alkyl or phenyl,
 n is 2,
 $R^1$ to $R^5$ are hydrogen, $C_1$–$C_4$-alkyl or $Si(R^8)_3$,
 $R^9$ to $R^{13}$ is hydrogen, $C_1$–$C_4$-alkyl or $Si(R^{14})_3$.

Particularly useful compounds of the formula Ib are those in which the cyclopentadienyl radicals are identical.

Examples of particularly suitable compounds are:

bis(cyclopentadienyl)zirconium dichloride,
bis(pentamethylcyclopentadienyl)zirconium dichloride,
bis(methylcyclopentadienyl)zirconium dichloride,
bis(ethylcyclopentadienyl)zirconium dichloride,
bis(n-butylcyclopentadienyl)zirconium dichloride and
bis(trimethylsilylcyclopentadienyl)zirconium dichloride and also the corresponding dimethylzirconium compounds.

Particularly suitable compounds of the formula Ic are those in which
 $R^1$ and $R^9$ are identical and are each hydrogen or a $C_1$–$C_{10}$-alkyl group,
 $R^5$ and $R^{13}$ are identical and are each hydrogen, or a methyl, ethyl, isopropyl or tert-butyl group,
 $R^2$, $R^3$, $R^{10}$ and $R^{11}$ have the meanings:
 $R^3$ and $R^{11}$ are $C_1$–$C_4$-alkyl
 $R^2$ and $R^{10}$ are hydrogen
 or two adjacent radicals $R^2$ and $R^3$ or $R^{10}$ and $R^{11}$ together form a cyclic group having from 4 to 20 carbon atoms,
 $R^{15}$ is

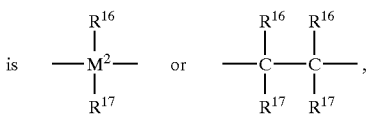

M is titanium, zirconium or hafnium and
$M^2$ is silicon
X is chlorine, $C_1$–$C_4$-alkyl or phenyl.

Examples of particularly suitable complexes Ic are:

dimethylsilanediylbis(cyclopentadienyl)zirconium dichloride,
dimethylsilanediylbis(indenyl)zirconium dichloride,
dimethylsilanediylbis(tetrahydroindenyl)zirconium dichloride,
ethylenebis(cyclopentadienyl)zirconium dichloride,
ethylenebis(indenyl)zirconium dichloride,
ethylenebis(tetrahydroindenyl)zirconium dichloride,
tetramethylethylene-9-fluorenylcyclopentadienylzirconium dichloride,
dimethylsilanediylbis(3-tert-butyl-5-methylcyclopentadienyl)zirconium dichloride,
dimethylsilanediylbis(3-tert-butyl-5-ethylcyclopentadienyl)zirconium dichloride,
dimethylsilanediylbis(2-methylindenyl)zirconium dichloride,
dimethylsilanediylbis(2-isopropylindenyl)zirconium dichloride,
dimethylsilanediylbis(2-tert-butylindenyl)zirconium dichloride,
diethylsilanediylbis(2-methylindenyl)zirconium dibromide,
dimethylsilanediylbis(3-methyl-5-methylcyclopentadienyl)zirconium dichloride,
dimethylsilanediylbis(3-ethyl-5-isopropylcyclopentadienyl)zirconium dichloride,
dimethylsilanediylbis(2-ethylindenyl)zirconium dichloride,
dimethylsilanediylbis(2-methylbenzindenyl)zirconium dichloride,
dimethylsilanediylbis(2-ethylbenzindenyl)zirconium dichloride,
methylphenylsilanediylbis(2-ethylbenzindenyl)zirconium dichloride, methylphenylsilanediylbis(2-methylbenzindenyl)zirconium dichloride,
diphenylsilanediylbis(2-methylbenzindenyl)zirconium dichloride,
diphenylsilanediylbis(2-ethylbenzindenyl)zirconium dichloride, and
diphenylsilanediylbis(2-methylindenyl)hafnium dichloride and also the corresponding dimethylzirconium compounds.

Further examples of suitable complexes Ic are:

dimethylsilanediylbis(2-methyl-4-phenylindenyl)zirconium dichloride,
dimethylsilanediylbis(2-methyl-4-[1-naphthylindenyl])zirconium dichloride,
dimethylsilanediylbis(2-methyl-4-isopropylindenyl)zirconium dichloride,
dimethylsilanediylbis(2-methyl-4,6-diisopropylindenyl)zirconium dichloride, dimethylsilanediylbis(2-ethyl-4-phenylindenyl)zirconium dichloride,
dimethylsilanediylbis(2-methyl-4-(para-4-butyl)phenylindenyl)zirconium dichloride, and also the corresponding dimethylzirconium compounds.

Particularly suitable compounds of the formula Id are those in which
M is titanium or zirconium,
X is chlorine, $C_1$–$C_4$-alkyl or phenyl,
$R^{15}$ is is 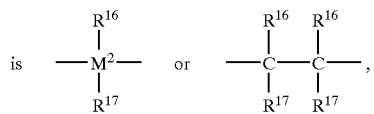

A is —O—, —S—,

and
$R^1$ to $R^3$ and $R^5$ are hydrogen, $C_1$–$C_{10}$-alkyl, $C_3$–$C_{13}$-cycloalkyl, $C_6$–$C_{15}$-aryl or Si($R^8$)$_3$, or two adjacent radicals form a cyclic group having from 4 to 12 carbon atoms.

Such complexes can be synthesized by methods known per se, with preference being given to reacting the appropriately substituted, cyclic hydrocarbon anions with halides of titanium, zirconium, hafnium, vanadium, niobium or tantalum.

Examples of appropriate methods are described, for example, in Journal of Organometallic Chemistry, 369 (1989), 359–370.

It is also possible to use mixtures of various metal complexes A), in particular different metallocene complexes.

The impregnation solution is generally prepared by dissolving or suspending the metal component, preferably the transition metal component, in particular the metallocene complex I, and, if desired, other additives such as cocatalysts in water or preferably organic solvents. Those skilled in the art will know which metal components can be combined with water and which can be combined with organic solvents.

Suitable organic solvents are all those in which the metal component is virtually completely soluble or soluble to an extent of at least 80% by weight. Well suited solvents are, for example, linear or cyclic, saturated, unsaturated or preferably aromatic hydrocarbons, halogenated $C_1$–$C_{20}$-hydrocarbons, $C_2$–$C_{20}$-ethers, $C_1$–$C_{20}$-alcohols or $C_2$–$C_{20}$-nitriles.

Well suited aromatic solvents are $C_6$–$C_{20}$-aromatics such as benzene, toluene, ethylbenzene, o-, m- or p-xylene, each of which may also be partially or fully substituted, for example by halogen atoms or alkyl radicals.

Further well suited solvents are $C_5$–$C_{20}$-aliphatic or alicyclic hydrocarbons such as pentane, n-hexane, n-heptane, isododecane.

Examples of suitable $C_2$–$C_{20}$-ethers are diethyl ether, di-tert-butyl ether, diphenyl ether, 1,4-dioxane and THF. Examples of well suited $C_1$–$C_{20}$-alcohols are methanol, ethanol, n-butanol, isopropanol, t-butanol and phenol.

It is also possible to use mixtures of the organic solvents.

In addition to the solvent, the impregnation solution can comprise the metal component as single significant component or else comprise the metal component and one or more additives such as compounds B) capable of forming metallocenium ions and/or organometallic compounds C).

The impregnation solution can comprise one or more different metal components A), preferably metallocene complexes I.

In the case of the transition metal compounds A), preferably the organometallic compounds of transition metals A), particularly in the case of the metallocene complexes I, the impregnation solution preferably further comprises compounds B) capable of forming metallocenium ions and/or organometallic compounds C) as additives.

The compounds B) capable of forming metallocenium ions are generally uncharged Lewis acids, ionic compounds containing strong Lewis-acid cations or Bronsted acids as cation, or aluminoxanes.

Strong, uncharged Lewis acids as component B) are compounds of the formula II $$M^3X^1X^2X^3 \qquad \text{II}$$

where
$M^3$ is an element of main group III of the Periodic Table, in particular B, Al or Ga, preferably B,
$X^1$, $X^2$ and $X^3$
are hydrogen, $C_1$–$C_{10}$-alkyl, $C_6$–$C_{15}$-aryl, alkylaryl, arylalkyl, haloalkyl or haloaryl each having from 1 to 10 carbon atoms in the alkyl radical and from 6 to 20 carbon atoms in the aryl radical or fluorine, chlorine, bromine or iodine, in particular haloaryls, preferably pentafluorophenyl.

Particular preference is given to compounds of the formula II in which $X^1$, $X^2$ and $X^3$ are identical, preferably tris(pentafluorophenyl)borane.

Ionic compounds as component B) which contain strong Lewis-acid cations are compounds of the formula III $$[(Y^{a+})Q_1Q_2 \ldots Q_z]^{d+} \qquad \text{III}$$

where
Y is an element of main groups I to VI or transition groups I to VIII of the Periodic Table,
$Q_1$ to $Q_z$ are singly negatively charged groups such as $C_1$–$C_{28}$-alkyl, $C_6$–$C_{15}$-aryl, alkylaryl, arylalkyl, haloalkyl, haloaryl each having from 6 to 20 carbon atoms in the aryl part and from 1 to 28 carbon atoms in the alkyl part, $C_3$–$C_{10}$-cyclo-alkyl which may bear $C_1$–$C_{10}$-alkyl groups as substituents, halogen, $C_1$–$C_{28}$-alkoxy, $C_6$–$C_{15}$-aryloxy, silyl or mercaptyl groups, a is an integer from 1 to 6 and z is an integer from 0 to 5, and d corresponds to the difference a-z, but d is greater than or equal to 1.

Particularly suitable Lewis-acid cations are carbonium cations, oxonium cations and sulfonium cations and also cationic transition metal complexes. Particular mention may be made of the triphenylmethyl cation, the silver cation and the 1,1'-dimethylferrocenyl cation. They preferably have noncoordinating counterions, in particular boron compounds as are mentioned in WO 91/09882, preferably tetrakis(pentafluorophenyl)borate.

Ionic compounds as component B) which have Bronsted acids as cations and preferably likewise noncoordinating counterions are mentioned in WO 91/09882; the preferred cation is N,N-dimethyl-anilinium.

The amount of compound capable of forming metallocenium ions is preferably from 0.1 to 10 equivalents, based on the transition metal component A).

The component B) can also be or include an aluminoxane.

Particularly useful cation-forming compounds B) are open-chain or cyclic aluminoxane compounds of the formula V or VI

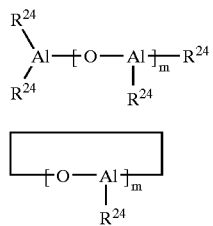

where $R^{24}$ is a $C_1$–$C_4$-alkyl group, preferably a methyl or ethyl group, and m is an integer from 5 to 30, preferably from 10 to 25.

The preparation of these oligomeric aluminoxane compounds is customarily carried out by reacting a solution of trialkylaluminum with water and is described, for example, in EP-A 284 708 and U.S. Pat. No. 4,794,096.

In general, the oligomeric aluminoxane compounds obtained in this way are in the form of mixtures of both linear and cyclic chain molecules of various lengths, so that m is to be regarded as a mean. The aluminoxane compounds can also be present in admixture with other metal alkyls, preferably with aluminum alkyls.

It is also possible to use, as component B), aryloxyaluminoxanes as described in U.S. Pat. No. 5,391,793, aminoaluminoxanes as described in U.S. Pat. No. 5,371,260, aminoaluminoxane hydrochlorides as described in EP-A 633 264, siloxyaluminoxanes as described in EP-A 621 279 or mixtures thereof.

It has been found to be advantageous to use the transition metal compound A) and the oligomeric aluminoxane compound in such amounts that the atomic ratio of aluminum from the oligomeric aluminoxane compound to the transition metal from the transition metal compound A) is in the range from 1:1 to $10^6$:1, preferably from 1:1 to $10^4$:1, in particular in the range from 1:1 to $10^3$:1.

The catalyst system of the present invention can, if desired, further comprise an organometallic compound as component C), preferably a metal compound of the formula IV $$M^1(R^{21})_r(R^{22})_s(R^{23})_t \qquad \text{IV}$$

where $M^1$ is an alkali metal, an alkaline earth metal or a metal of main group III of the Periodic Table, i.e. boron, aluminum, gallium, indium or thallium, $R^{21}$ is hydrogen, $C_1$–$C_{10}$-alkyl, $C_6$–$C_{15}$-aryl, alkylaryl or arylalkyl each having from 1 to 10 carbon atoms in the alkyl radical and from 6 to 20 carbon atoms in the aryl radical, $R^{22}$ and $R^{23}$ are hydrogen, halogen, $C_1$–$C_{10}$-alkyl, $C_6$–$C_{15}$-aryl, alkylaryl, arylalkyl or alkoxy each having from 1 to 10 carbon atoms in the alkyl radical and from 6 to 20 carbon atoms in the aryl radical, r is an integer from 1 to 3 and s and t are integers from 0 to 2, where the sum r+s+t corresponds to the valence of $M^1$.

If the component C) is present together with A) and/or B), it is not identical to the components A) and, in particular, B).

Among the metal compounds of the formula IV, preference is given to those in which $M^1$ is lithium, magnesium or aluminum and $R^{21}$ to $R^{23}$ are $C_1$–$C_{10}$-alkyl.

Particularly preferred metal compounds of the formula IV are n-butyllithium, n-butyl-n-octylmagnesium, n-butyl-n-heptylmagnesium, tri-n-hexylaluminum, triisobutylaluminum, triethylaluminum and trimethylaluminum.

If a component C) is used, it is preferably present in the catalyst system in an amount of from 800:1 to 1:1, in particular from 500:1 to 50:1 (molar ratio of $M^1$ from IV to transition metal M from I).

If the impregnation solution comprises, apart from the solvent, only the metal component A) as significant component, the supported catalyst component according to the present invention is generally isolated first and then, either in the presence of the substrates to be reacted, e.g. monomers, or in their absence, activated by addition of the components B) and/or C).

Support materials used in the catalyst system of the present invention are preferably finely divided supports which have a particle diameter in the range from 0.1 to 1000 μm, preferably from 10 to 300 μm, in particular from 30 to 70 μm. Suitable organic supports are, for example, finely divided polymers, e.g. finely divided polyethylene or finely divided polypropylene. Suitable inorganic supports are, for example, aluminum oxide, silicon dioxide, titanium dioxide or their mixed oxides, aluminum phosphate or magnesium chloride. Preference is given to using silica gels of the formula $SiO_2 \cdot a\, Al_2O_3$, where a is from 0 to 2, preferably from 0 to 0.5. The support particles can be used in granular form or in spray-dried, microscopic form. Such products are commercially available, e.g. silica gel 332 from Grace or ES 70 X from Crosfield.

Preferred inorganic support materials are acid, inorganic metal or semimetal oxides having a very high porosity, as are described, for example, in the earlier German Patent Application 197 20 980.7, in particular on page 3, line 45 to page 5, line 11.

The support materials can have been pretreated thermally or chemically (e.g. with metal alkyl compounds) in order to achieve a certain property profile of the support (e.g. water content and/or OH group content).

The pore volume of the support materials used is generally in the range from 0.1 ml/g to 10.0 ml/g, preferably in the range from 0.5 ml/g to 3.0 ml/g. The pore volume can be determined by the method of nitrogen adsorption in accordance with DIN 66131 or mercury porosimetry in accordance with DIN 66133.

The support substances can be thermally dried by baking out at temperatures in the range from 50 to 1200° C., preferably in the range from 80 to 800° C. They can additionally or alternatively be pretreated chemically by allowing organometallic compounds of the formula IV, in particular tri-$C_1$–$C_4$-alkylaluminums such as triisobutylaluminum, and/or aluminoxanes of the formula V and/or VI to act on them.

Preference is given to using silica gels having the defined parameters as support materials.

In the impregnation process of the present invention, the impregnation solution, whose composition has been described above, flows in a directed stream through the support material particles, likewise described above. There is not only flow between the individual support particles, but also flow through the particles. This improves mass transfer from the impregnation solution to the internal surface of the support material.

In contrast, according to the present state of knowledge, the impregnation solution in the prior art impregnation methods described at the outset penetrates uniformly into the particle from all sides, leading to the formation of concentration gradients.

The impregnation process of the present invention can be carried out in different variants. A generally column-shaped or cylindrical or tubular reaction vessel with inlet and outlet devices, comparable to a chromatography column, is filled to a certain height with the support material.

| | |
|---|---|
| Variant A): | the impregnation solution is introduced onto the surface of the support material and, with the outlet device open, is allowed to flow through the support material. |
| Variant B): | the entire impregnation solution is, with the outlet device closed, introduced onto the surface of the support material but does not yet run out. The mixture is stirred up briefly and the impregnation solution is then allowed to flow through the support material. |
| Variant C): | the entire impregnation solution is introduced onto the surface of the support material. With the outleet device open, part of the impregnation solution is allowed to flow through the support material. The outlet device is then closed, the mixture is stirred and the impregnation solution is then drained completely through the support material. |

In each variant A) to C), the impregnated catalyst can, preferably after no more solvent runs out, be left to stand for from 0.1 to 100 hours, preferably from 0.5 to 24 hours, while, according to the present state of knowledge, the pore volume is still filled with the impregnation solution.

The impregnation solution generally flows through the support material under its own pressure. However, it is also possible to allow a pressure in the range from 1 to 1000 mbar to act on the liquid column of impregnation solution. The flow rate of the impregnation solution is generally in the range from 0.1 to 100.0 ml/(g of support material×h), preferably in the range from 1.0 to 50.0 ml/(g of support material×h).

In general, the catalyst or the catalyst precursor is washed by rinsing with one or more low-boiling solvents. Preference is here given to solvents or solvent mixtures in which the metallocene or metallocenes and/or the additives B) and/or C) are less soluble than in the impregnation solution. The catalyst or the catalyst precursor is subsequently discharged as a suspension or dried using customary methods such as application of a vacuum or passing through an inert gas such as nitrogen. It is then obtained in free-flowing form.

In general, the volume of the impregnation solution is at least 1.5 times the pore volume of the chemically untreated support used. The volume of the impregnation solution is preferbaly from three to 10 times the pore volume of the chemically untreated support. The pore volume can be measured by the method of nitrogen adsorption (DIN 66131) or mercury porosimetry (DIN 66133).

As support material, it is also possible to use a Ziegler catalyst solid, usually based on titanium, or a Phillips catalyst, usually based on Cr. Such catalysts are described, for example, in Angew. Chemie 92, 869–87 (1980); EP-A 45975; EP-A 45977; EP-A 86473; EP-A 171200; EP-A 429937; DE-A 4132894; GB-A 2111066; U.S. Pat. No. 4,220,554; U.S. Pat. No. 4,339,054; U.S. Pat. No. 4,472,524; U.S. Pat. No. 4,473,660; U.S. Pat. No. 4,857,613. If a Ziegler or Phillips catalyst solid is used as support material, the process of the present invention gives a multicenter catalyst in which chemically different metals or metal complex fragments are present.

In the impregnation process of the present invention, the entire impregnation solution is, if desired using the variants A, B or C mentioned, allowed to flow through the support material and the catalyst is isolated. The eluted solvent or the impregnation solution depleted in components A) to C) can be used further. In the impregnation solution depleted in the components A) to C), the original concentration of the components A) to C) can be restored, for example by addition of the components or by partial evaporation of the solution (recycling). This impregnation solution can then be reused for the impregnation.

This process can be carried out continuously, but preferably batchwise.

The supported catalysts or supported catalyst components obtainable by the process of the present invention have a different loading level of the individual support particles, but virtually no unladen support particles can be detected. Here, the loading level is the concentration of the metal component used according to the present invention in the individual support particles. This means that the supported catalysts or the supported catalyst components obtainable are usually made up of fractions of supported catalyst particles or supported catalyst component particles which have a significantly different metal component content.

This phenomenon is referred to as loading level distribution in the following.

It is surprising that such a "heterogeneous" (based on the metal component concentration of the fractions) supported catalyst or supported catalyst component displays good process utility, for example in polymerization processes.

Both the integrated loading level, i.e. the sum of the metal components applied to the support material used, and the loading level distribution can be adjusted within wide limits by means of the starting concentration of metal component and any additives used in the impregnation solution, the volume of impregnation solution used and the choice of the solvent.

To analyze the loading level distribution, cf. Examples 10 and 11, the loading level of the catalyst particles is first measured at various points along the flow distance of the impregnation solution. For an empirically selected function of the type f(x)=a exp(−bx)+c (where x: flow distance; f(x): loading level in $\mu$ mol of metallocene (or metal component)/g of catalyst), the coefficients a, b and c which give the best fit of the function to the measured points are determined. Transformation and normalization of this mathematical relationship between loading level and flow distance for the supported catalyst gives a distribution function P(x) for the loading level (x: loading level) of the type P(x)=$\alpha$ ln (x−c) [$\alpha$: normalization coefficient] and, by differentiation, the corresponding (probability) density function p(x)=$\alpha$/(x−c). This density function can then be used to determine the 1st moment (arithmetic means) $\mu_1$ of the loading level distribution, $$\mu_1 = <x> = \int_a^b x p(x) dx$$

[a: minimum loading, i.e. measured value for 50 mm flow distance b: maximum loading, i.e. measured value for 0 mm flow distance]

its variance var(x), $$var(x) = <x^2> - \mu_1^2$$

where $<x^2> = \int_a^b x^2 p(x) dx$

[a,b: see above]

the standard deviation $\sigma$ $$\sigma = (var(x))^{0.5}$$

and the skewness s $$s = <((x-\mu_1)/\sigma)^3> = \sigma^{-3} \int_a^b (x-\mu_1)^3 p(x) dx$$

[a,b: see above].

For this purpose, the integrals were calculated numerically by the trapezoidal rule (steps: 1/10,000 of the total interval).

Preferred metal-containing supported catalysts have an asymmetric loading level distribution. Their loading level distribution has a standard deviation of at least 1% of the 1st moment of the distribution, and a skewness s which fulfills the condition $s^2>0.0001$. Particularly preferred metal-containing supported catalysts fulfill the condition s>+0.01.

The supported catalysts obtainable by the process of the present invention can also be prepolymerized.

It is surprising that such a "heterogeneous" (based on the metal component concentration of the fractions) supported catalyst or supported catalyst component displays good utility in processes, for example in polymerization processes.

The catalyst system of the present invention is generally used for the polymerization of monomers having a C-C double bond or C-C triple bond. The C-C double bond or the C-C triple bond or both can be terminal or internal, either exocyclic or endocyclic. Preferred monomers having a C-C triple bond are $C_2$–$C_{10}$-alk-1-ynes, such as ethyne, propyne, 1-butyne, 1-hexyne and also phenylacetylene. The polymerization process of the present invention is preferably used for the polymerization or copolymerization of $C_2$–$C_{12}$-alk-1-enes. As $C_2$–$C_{12}$-alk-1-enes, preference is given to ethylene, propylene, 1-butene, 1-pentene, 4-methyl-1-pentene, 1-hexene, 1-heptene or 1-octene or vinylaromatic monomers such as styrene, p-methylstyrene or 2,4-dimethylstyrene or mixtures of these $C_2$–$C_{12}$-alk-1-enes. Particular preference is given to homopolymers or copolymers of ethylene or of propylene, where the proportion of ethylene or of propylene in the copolymers is at least 50 mol %. Among the copolymers of ethylene, preference is given to those in which propylene, 1-butene, 1-hexene or 1-octene or mixtures thereof are present as further monomers. The copolymers of propylene are, in particular, copolymers in which ethylene or 1-butene or mixtures thereof are present as further monomers.

The polymerization process of the present invention is preferably used for preparing polymers consisting of from 50 to 100 mol % of ethylene and from 0 to 50 mol %, in particular from 0 to 30 mol % of $C_3$–$C_{12}$-alk-1-enes.

Preference is also given to polymers consisting of from 50 to 100 mol % of propylene, from 0 to 50 mol %, in particular from 0 to 30 mol %, of ethylene and from 0 to 20 mol %, in particular from 0 to 10 mol %, of $C_4$–$C_{12}$-alk-1-enes.

The sum of the mol % is always 100.

The polymerization can be carried out in the processes customary for the polymerization of olefins, for example solution processes, suspension processes, stirred gas-phase processes or gas-phase fluidized-bed processsses, continuously or batchwise. Solvents or suspension media which can be used are inert hydrocarbons, for example isobutane, or else the monomers themselves. Particularly well suited methods of preparing the polymers are the suspension process and the gas-phase process (stirred gas phase, gas-phased fluidized bed).

Suitable reactors are, for example, continuously operated stirred vessels, loop reactors or fluidized-bed reactors; if desired, it is also possible to use a plurality of reactors connected in series (reactor cascade).

The polymerization using the process of the present invention is generally carried out at from −50 to 300° C., preferably from 0 to 150° C., and at pressures generally in the range from 0.5 to 3000 bar, preferably in the range from 1 to 80 bar. In the polymerization process of the present invention, it is advantageous to set the residence times of the respective reaction mixtures to from 0.5 to 5 hours, in particular from 0.7 to 3.5 hours. It is also possible to use, inter alia, antistatics and molecular weight regulators, for example hydrogen, in the polymerization.

Apart from polymerisation, the catalyst system of the present invention can also be used for stoichiometric or catalytic carbon-carbon linkage, also for the reduction of carbonyl groups >C═O, or imino groups >C═NH with carbon radicals, hydrides or amides and also in the Diels-Alder reaction and the hydrogenation of unsaturated carbon-carbon, carbon-heteroatom or heteroatom-heteroatom bonds using hydrogen and/or hydrides.

In general, these reactions occur in the low molecular weight range and generally lead to products having a molecular weight of less than about 1000.

The polymers obtainable using the polymerization process of the present invention can be used for producing films, fibers and moldings.

EXAMPLES

All preparative work was carried out using standard Schlenk techniques under a protective $N_2$ or Ar gas atmosphere in glass vessels which had previously been made inert.

Example 1

Chemical Drying of Granular $SiO_2$ 1000 g of silica gel (SG 332, mean diameter: 50 mm, pore volume: 1.75 ml/g, from Grace; baked out for 8 hours at 180° C. under reduced pressure (1 mbar)) were suspended in 5 l of toluene under an $N_2$ atmosphere. At 18° C., 7.75 l (6.83 kg) of 1.53 molar methylaluminoxane solution (in toluene, from Witco) were added over a period of 120 minutes. The mixture was subsequently stirred for 7 hours at RT, filtered and the filter cake was washed twice with 2.5 l each time of toluene. The support precursor was then dried under reduced pressure. This gave 1.35 kg of chemically dried precursor.

Example 2

2.1: Preparation of a supported metallocene catalyst according to the present invention (solution volume= 1.85 times the pore volume)

A Schlenk frit which had been made inert (diameter: about 2 cm) was charged with 5 g of the precursor prepared in Example 1 (pore volume: 1.3 ml/g) (about 5 cm thick layer). In a separate flask, 72 mg (125 mmol) of rac-dimethylsilylenebis(2-methylbenz[e]indenyl)zirconium dichloride were dissolved in 12 ml of 1.53 molar (based on Al) MAO solution (from Witco: 10% by weight of methylaluminoxane in toluene). After stirring for another 30 minutes, the precursor in the Schlenk frit was carefully covered. After 1 hour, the supernatant solution had run through and $N_2$ was briefly passed through the supported catalyst which remained to push through remaining solution. The impregnation solution which ran through here was now only slightly colored and was discarded. The supported catalyst which remained had a deep orange color in the upper part while the lower part was only slightly colored. It was washed 4 times with 5 ml of pentane without stirring and was subsequently dried in a stream of $N_2$ (from above). For the polymerization, about 2 g were taken from the upper region of the column.

2.2: Polymerization (1 l autoclave)

2.5 mmol of triisobutylaluminum (TiBA; 1.25 ml of a 2 molar solution in heptane) were placed in a dry 1 l autoclave which had been flushed with $N_2$. After addition of 6 mg of Stadis® 450 (10% by weight based on the catalyst composition; Stadis® 450 is a product of DuPont), 500 ml of liquid propene were added. Subsequently, 60 mg of the supported metallocene catalyst prepared in Example 2.1 were blown in via a lock using $N_2$, the autoclave was heated to 605 C and the polymerization was carried out at this temperature. After 90 minutes, the polymerization was stopped by venting the remaining propene and the product was drained off through a bottom valve. This gave 166 g of polypropylene powder without any coarse material (productivity: 2765 g of PP/g of catalyst). Subsequent inspection of the autoclave found no deposits or lumps.

Example 3

Chemical Drying of Spray-dried $SiO_2$ No. I 1000 g of spray-dried silica gel (mean particle diameter: 19.8 mm; BET surface area in accordance with DIN 66131: 333.5 $m^2$; pore volume: 1.66 ml/g; baked out for 8 hours at 180° C. under reduced pressure (1 mbar)) were suspended in 5 l of toluene under an $N_2$ atmosphere. At 18°°C., 7.75 l (6.83 kg) of 1.53 molar methylaluminoxane solution (in toluene, from Witco) were added over a period of 120 minutes. The mixture was subsequently stirred for 7 hours at RT, filtered and the filter cake was washed twice with 2.5 l each time of toluene. The support precursor was then dried under reduced pressure. This gave 1.38 kg of chemically dried precursor.

Example Vl (Comparative Example)

C 1.1: Preparation of a supported metallocene catalyst (solution volume=pore volume)

A Schlenk frit which had been made inert (diameter: about 2 cm) was charged with 5 g of the precursor prepared in Example 3 (pore volume: 1.2 ml/g) (about 5 cm thick layer). In a separate flask, 72 mg (125 mmol) of rac-dimethylsilylenebis(2-methylbenz[e]indenyl)zirconium dichloride were dissolved in 6 ml of 1.53 molar (based on Al) MAO solution (from Witco: 10% by weight of methylaluminoxane in toluene). After stirring for another 30 minutes, the precursor in the Schlenk frit was carefully covered. After about 1 hour, the supernatant solution had run through and the supported catalyst which remained was left to stand for 20 hours while being protected from light. $N_2$ was then briefly passed through to push through remaining solution. The impregnation solution which ran through here was colorless and was discarded. The precursor had been loaded only in the upper section (recognizable by the orange color). The lower part of the column was completely white. It was washed 6 times with 5 ml each time of pentane without stirring and was subsequently dried in a stream of $N_2$ (from above). The catalyst contained a high proportion of unladen (white) support particles.

Example 4

4.1. Preparation of a supported metallocene catalyst according to the present invention (solution volume=4 times the pore volume)

A Schlenk frit which had been made inert (diameter: about 2 cm) was charged with 2.5 g of the precursor prepared in Example 3 (pore volume: 1.2 ml/g) (about 2.5 cm thick layer). In a separate flask, 144 mg (250 mmol) of rac-dimethylsilylenebis(2-methylbenz[e]indenyl)zirconium dichloride were dissolved in 12 ml of 1.53 molar (based on Al) MAO solution (from Witco; 10% by weight of methylaluminoxane in toluene). After stirring for another 30 minutes, the solution was introduced into the Schlenk frit and the initially charged precursor was briefly stirred up (about 30 s). After about 1 hour, the supernatant solution had run through and the supported catalyst which remained was allowed to stand for 20 hours while being protected from light. $N_2$ was then briefly passed through to push through remaining solution. The impregnation solution which ran through here had a slight orange color and was discarded. The precursor had all been loaded (uniform deep orange color of the supported catalyst). It was washed 6 times with 5 ml each time of pentane with stirring and was subsequently dried in a stream of $N_2$ (from above). The yield was about 2.75 g of supported catalyst (Zr content: 42.8 mmol/g % metallocene utilization: >94%).

4.2: Polymerization (1 l autoklave)

Example 2.2 was repeated using 48 mg of supported catalyst from Example 4.1, giving 160 g of polypropylene powder (productivity: 3330 g of PP/g of catalyst). Subsequent inspection of the autoclave revealed no deposits or lumps.

Example 5

Chemical Drying of Spray-dried $SiO_2$ No. II 1000 g of spray-dried silica gel (mean particle diameter: 26 mm; BET surface area in accordance with DIN 66131: 310$m^2$; pore volume: 1.38 ml/g; baked out for 8 hours at 180° C. under reduced pressure (1 mbar)) were suspended in 5 l of toluene under an $N_2$ atmosphere. At 18° C., 7.75 l (6.83 kg) of 1.53 molar methylaluminoxane solution (in toluene, from Witco) were added over a period of 120 minutes. The mixture was subsequently stirred for 7 hours at RT, filtered and the filter cake was washed twice with 2.5 l each time of toluene. The support precursor was then dried under reduced pressure. This gave 1.37 kg of chemically dried precursor.

Example 6

6.1: Preparation of a supported metallocene catalyst according to the present invention A Schlenk frit which had been made inert (diameter: about 10 cm) was charged with 100 g of the precursor prepared in Example 5 (pore volume: 1.0 ml/g) (about 5 cm thick layer). In a separate flask, 2880 mg (5 mmol) of rac-dimethylsilylenebis(2-methylbenz[e]indenyl)zirconium dichloride were dissolved in 240 ml of 1.53 molar (based on Al) MAO solution (from Witco: 10% by weight of methylaluminoxane in toluene). After stirring for another 30 minutes, the solution was introduced into the Schlenk frit and the initially charged precursor was carefully covered. The initially coverless, later increasingly orange filtrate which ran through (about 120 ml) was recirculated a total of 4 times until the precursor had a uniform orange colour. The moist supported catalyst was subsequently allowed to stand for 48 hours while being protected from light and $N_2$ was then briefly passed through to push through remaining solution. The impregnation solution which ran through here had an orange color and was kept for the next experiment. The precursor had all been loaded (uniform deep orange color of the supported catalyst). It was washed 4 times with 200 ml each time of pentane with stirring and was subsequently dried in a stream of $N_2$ (from above). The yield was 113.9 g of supported catalyst (Zr content: 38.4 mmol/g % metallocene utilization: 87.5%).

6.2: Polymerization (1 l autoclave)

Example 2.2 was repeated using 53 mg of supported catalyst from Example 6.1, giving 268 g of polypropylene powder (productivity: 5055 g of PP/g of catalyst). Subsequent inspection of the autoclave revealed no deposits or lumps.

6.3. Polymerization in a continuous gas-phase process

The supported metallocene catalyst prepared in Example 6.1 was used for continuous homopolymerization of propene in a vertically mixed 200 l gas-phase reactor. The reactor contained a bed of finely divided polymer and was operated at a constant output of 20 kg/h. The reactor pressure was 24 bar and the reactor temperature was 605 C. As cleaning alkyl, 30 mmol/h of triisobutylaluminum were fed in (1 molar solution in heptane). This gave a polymer powder having a bulk density of 475 g/l, a mean particle size of $d_{avg.}$=1.16 mm and 2% by weight of particles having a diameter d>2 mm (polymer data: $T_m$: 147.85 C, [h]: 2.21 dl/g, MFI: 4.2 g/10', $X_s$: 0.4% by weight). The catalyst productivity was 6.2 kg of PP/g of catalyst.

Example 7

7.1: Preparation of a supported metallocene catalyst according to the present invention using recycled impregnation solution A Schlenk frit which had been made inert (diameter: about 6 cm) was charged with 20 g of the precursor prepared in Example 5 (pore volume: 1.0 ml/g) (about 2.5 cm thick layer) and carefully covered with the impregnation solution which had already been used in Example 6.1. The initially colorless, later slightly orange filtrate which ran through (about 80 ml) was recirculated a total of four times until the precursor had a uniform orange color. The moist supported catalyst was subsequently allowed to stand for 96 hours while being protected from light and $N_2$ was then briefly passed through to push through remaining solution. The impregnation solution which ran through here had a slight orange color and was discarded. The precursor had all been loaded (uniform orange color of the supported catalyst). It was washed 3 times with 50 ml each time of pentane with stirring and was subsequently dried in a stream of $N_2$ (from above). The yield was 20.7 g of supported catalyst (Zr content: 14.3 mmol/g % metallocene utilization: 5.9% of the amount used in Example 6.1. Overall utilization in Examples 6.1 and 7.1:93.4%).

7.2: Polymerization (1 l autoclave)

Example 2.2 was repeated using 59 mg of supported catalyst from Example 7.1, giving 133 g of polypropylene powder (productivity: 2250 g of PP/g of catalyst). Subsequent inspection of the autoclave revealed no deposits or lumps.

Example C 2 (Comparative Example)

C 2.1: Preparation of a supported metallocene catalyst using a method similar to that in WO 94/28034 (low metallocene loading)

In a dry glass flask which had been flushed with $N_2$, 57.8 mg (0.1 mmol) of rac-dimethylsilylenebis(2-methylbenz[e] indenyl)zirconium dichloride were added to 13.2 ml of methylaluminoxane solution (1.53 molar based on Al; 10% strength by weight methylaluminoxane solution in toluene from Witco). After stirring for 30 minutes, first 10 ml of toluene and then 10 g of the silica gel which had been chemically dried in Example 1 were added. The mixture was stirred for another 30 minutes and the solvent was then slowly taken off over a period of 2 hours. This left 11.3 g of an orange, free-flowing supported metallocene catalyst (metallocene utilization: 100%).

C 2.2: Polymerization (1 l autoclave)

Example 2.2 was repeated using 128 mg of supported catalyst from Example C 2.1, giving 215 g of polypropylene powder (productivity: 1680 g of PP/g of catalyst).

Example C 3 (Comparative Example)

C 3.1: Preparation of a supported metallocene catalyst using a method similar to that in WO 94/28034 (high metallocene loading)

In a dry glass flask which had been flushed with $N_2$, 145 mg (0.25 mmol) of rac-dimethylsilylenebis(2-methylbenz[e] indenyl)zirconium dichloride were added to 15 ml of methylaluminoxane solution (1.53 molar based on Al; 10% strength by weight methylaluminoxane solution in toluene from Witco). After stirring for 30 minutes, first 10 ml of toluene and then 10 g of the silica gel which had been chemically dried in Example 1 were added. The mixture was stirred for another 30 minutes and the solvent was then taken off slowly over a period of 2 hours. This gave 11.6 g of an orange, free-flowing supported metallocene catalyst (metallocene utilization: 100%).

C 3.2: Polymerization (1 l autoclave)

Example 2.2 was repeated using 180 mg of supported catalyst from Example C 3.1. The polymerization had to be stopped after 37 minutes since the stirrer became blocked. After draining off the remaining propene, 74 g of polypropylene having a partly coarse morphology were able to be discharged. After opening the autoclave, a further 50 g of lumps, some of which adhered to the stirrer, were found. The autoclave wall was coated with a light deposit. (Productivity: 690 g of PP/g of catalyst).

Example C 4 (Comparative Example)

C 4.1: Preparation of a supported metallocene catalyst using a method similar to that in WO 94/14856 (solution volume 3 pore volume)

73 mg (0.13 mmol) of rac-dimethylsilylenebis(2-methylbenz[e]indenyl)zirconium dichloride were placed in a dry glass flask which had been flushed with $N_2$. A solution of methylaluminoxane in toluene (1.53 molar based on Al; 10% strength by weight methylaluminoxane solution, from Witco) was subsequently added until the metallocene was just completely dissolved. This required 6 ml. After stirring for 30 minutes, the solution obtained ws then applied uniformly to 5 g of the silica gel which had been chemically dried in Example 1 (pore volume: 1.3 ml/g). The mixture was stirred for another 30 minutes and the solvent was slowly taken off over a period of 2 hours. This gave 5.7 g of an orange, free-flowing supported metallocene catalyst (metallocene utilization: 100%; 22.2 mmol of Zr/g).

C 4.2: Polymerization (1 l autoclave)

Example 2.2 was repeated using 167 mg of supported catalyst from Example C 4.1, giving 167 g of polypropylene powder (productivity: 1000 g of PP/g of catalyst).

Example 8

Chemical Drying of Spray-dried $SiO_2$ No. III 20 g of spray-dried silica gel (mean particle diameter: 45 mm; specific surface area: 307 $m^2$; pore volume: 1.53 ml/g; baked out for 8 hours at 180° C. under reduced pressure (1 mbar)) were suspended in 150 ml of toluene under an $N_2$ atmosphere. At room temperature, 155 ml (137 g) of 1.53 molar (based on Al) methylaluminoxane solution (in toluene, from Witco) were slowly added. The mixture was subsequently stirred for 12 hours at RT, filtered and the filter cake was first washed twice with 50 ml each time of toluene and subsequently washed twice with 50 ml each time of pentane. The support precursor was then dried under reduced pressure. This gave 26.4 g of chemically dried $SiO_2$ precursor.

Example 9

9.1: Preparation of a supported metallocene catalyst according to the present invention A Schlenk frit which had been made inert (diameter: about 2 cm) was charged with 5 g of the precursor prepared in Example 8 (pore volume: 1.16 ml/g) (about 5 cm thick layer). In a separate flask, 240 mg (0.42 mmol) of rac-dimethylsilylenebis(2-methylbenz[e]indenyl)zirconium dichloride were dissolved in 20 ml of 1.53 molar (based on Al) MAO solution (from Witco: 10% by weight of methylaluminoxane in toluene). After stirring for another 30 minutes, the solution was introduced into the Schlenk frit and the initially charged precursor was carefully covered. The supernatant impregnation solution had run through within one hour (initially colorless, later increasingly orange). The moist supported catalyst was subsequently allowed to stand for 20 hours while being protected from light and $N_2$ was then briefly passed through to push through remaining solution. The remaining impregnation solution which ran through here was orange and was discarded. The precursor had all been loaded (uniform deep orange color) of the supported catalyst. It was washed 4 times with 10 ml each time of pentane with stirring and was subsequently dried in a stream of $N_2$ (from above). The yield was 5.6 g of supported catalyst (Zr content: 62.5 mmol/g % metallocene utilization: 84.1%).

9.2: Polymerization (10 l autoclave)

100 g of polypropylene powder, 9 ml of a 2 molar triisobutylaluminum solution in heptane and 1 ml of a 2 molar diisobutylaluminum hydride solution in heptane were added in succession to a dry 10 l autoclave which had been flushed with nitrogen. Subsequently, 210 mg of the supported metallocene catalyst prepared in 9.1 were introduced in a countercurrent of nitrogen into the autoclave while stirring, the autoclave was closed and was charged at 255 C and a stirrer speed of 350 rpm with 7.0 l of liquid propene. The temperature was subsequently increased stepwise to 655 C, with the internal pressure rising to 26–28 bar. Polymerization was then carried out for 90 minutes at 655 C and 250–300 rpm.

After polymerization was complete, the autoclave was depressurized to atmospheric pressure over a period of 15 minutes and the polymer formed was discharged in a stream of nitrogen. This gave 2589 g of polypropylene powder (productivity: 12,330 g of PP/g of catalyst). Subsequent inspection of the autoclave revealed no deposits or lumps.

Example C 6 (Comparative Example)

C 6.1: Preparation of a supported metallocene catalyst (precipitation method similar to that of WO 98/01481)

6.6 g of the $SiO_2$ support which had been chemically dried in Example 8 were added to a solution of 300 mg of rac-dimethylsilylenebis(2-methylbenz[e]indenyl)zirconium dichloride in 68 ml of 1.53 molar (based on Al) MAO solution (from Witco: 10% by weight of methylaluminoxane in toluene) and stirred at RT. After 24 hours, 165 ml of isododecane were slowly added dropwise. The mixture was subsequently stirred for another 2 hours, the orange solid was filtered off, washed twice with 50 ml each time of pentane and dried in a stream of nitrogen. The yield was 8.3 g of supported metallocene catalyst (Zr content: 43.9 mmol/g % metallocene utilization: 70%).

C 6.2: Polymerization (10 l autoclave)

The polymerization was carried out by a method analogous to Example 9.2 using 238 mg of the supported catalyst prepared in C 6.1. This gave 2870 g of polypropylene powder (productivity: 12,050 g of PP/g of catalyst). Subsequent inspection of the autoclave revealed no deposits or lumps.

Comparison of C6 with Example 9 shows that the process of the present invention leads to better utilization of the metallocene.

Example 10

10.1: Preparation of a supported metallocene catalyst according to the present invention A Schlenk frit which had been made inert (diameter: about 2 cm) was charged with 5 g of the precursor prepared in Example 5 (pore volume: 1.0 ml/g) (about 5 cm thick layer). In a separate flask, 144 mg (250 mmol) of rac-dimethylsilylenebis(2-methylbenz-[e]indenyl)zirconium dichloride were dissolved in 12 ml of 1.53 molar (based on Al) MAO solution (from Witco: 10% by weight of methylaluminoxane in toluene). After stirring for another 2 hours, the solution was introduced into the Schlenk frit and the initially charged precursor was carefully covered. After the supernatant impregnation solution had run through, the first 5 ml which had run through colorless were again introduced onto the column. After the impregnation solution had run through again, the supported catalyst which remained was allowed to stand for 20 hours while being protected from light. $N_2$ was then briefly passed through to push through remaining solution. The impregnation solution which ran through here had an orange color and was discarded. The precursor had all been loaded (uniform deep orange color of the supported catalyst). It was washed 3 times with 10 ml each time of pentane without stirring and was subsequently dried in a stream of $N_2$ (from above). Samples of catalyst were then taken from the surface (sample 10a: flow distance of the impregnation solution=about 0 mm), from the middle (sample 10b: flow distance of the impregnation solution= about 25 mm) and from the lower region immediately above the frit (sample 10c: flow distance of impregnation solution= about 50 mm). The following loadings were found:

10a: 0.36% by weight of Zr/g % 39.5 mmol of metallocene/g of catalyst

10b: 0.31% by weight of Zr/g % 34.0 mmol of metallocene/g of catalyst

10c: 0.30% by weight of Zr/g % 32.9 mmol of metallocene/g of catalyst

For the mixed catalyst (5.5 g), a mean Zr content of 0.32% by weight was found (35.4 mmol of metallocene/g of catalyst % metallocene utilization: 78%).

The standard deviation of the mean and the skewness s of the loading level distribution for the supported catalyst were derived from the loading level distribution found.

For a function $f(x)=a \exp(-bx)+c$ (where x=flow distance), the coefficients a, b and c which give a curve running through the three above-indicated measured points were determined (FIG. 1). This mathematical relationship between loading level and flow distance for the supported catalyst gave a first moment (arithmetic mean) $\mu_1$=34.7 μmol/g, a standard deviation σ=1.76 μmol/g (5.1% based on $\mu_1$) and a skewness s=1.049.

10.2: Polymerization (1 l autoclave)

Example 2.2 was repeated using 45 mg of supported catalyst from Example 10.1, giving 194 g of polypropylene powder (productivity: 4310 g of PP/g of catalyst). Subsequent inspection of the autoclave revealed no deposits or lumps.

Example 11

Preparation of a supported metallocene catalyst according to the present invention A Schlenk frit which had been made inert (diameter: about 2 cm) was charged with 5 g of the precursor prepared in Example 5 (pore volume: 1.0 ml/g) (about 5 cm thick layer). In a separate flask, 240 mg (416 mmol) of rac-dimethylsilylenebis(2-methylbenz[e]indenyl)zirconium dichloride were dissolved in 20 ml of 1.53 molar (based on Al) MAO solution (from Witco: 10% by weight of methylaluminoxane in toluene). After stirring for another 2 hours, the solution was introduced into the Schlenk frit and the initially charged precursor was carefully covered. After the supernatant impregnation solution had run through, the supported catalyst which remained was allowed to stand for 72 hours while being protected from light. $N_2$ was then briefly passed through to push through remaining solution. The impregnation solution which ran through here had an orange color and was discarded. The precursor had all been loaded (uniform deep orange color of the supported catalyst). It was washed 3 times with 10 ml each time of pentane without stirring and was subsequently dried in a stream of $N_2$ (from above). Catalyst samples were taken from the surface (Sample 11a: flow distance of the impregnation solution=about 0 mm), from the middle (Sample 11b: flow distance of the impregnation solution=about 25 mm) and the lower region immediately above the frit (Sample 11c: flow distance of the impregnation solution=about 50 mm). The following loadings were found:

11a: 0.68% by weight of Zr/g % 74.6 mmol of metallocene/g of catalyst

11b: 0.49% by weight of Zr/g % 53.7 mmol of metallocene/g of catalyst

11c: 0.36% by weight of Zr/g % 39.5 mmol of metallocene/g of catalyst

For the mixed catalyst (5.6 g), a mean Zr content of 0.50% by weight was found (54.8 mmol of metallocene/g of catalyst % metallocene utilization: 74%).

The standard deviation of the mean and the skewness s of the loading level distribution for the supported catalyst were derived from the loading level distribution found.

Figure 2:
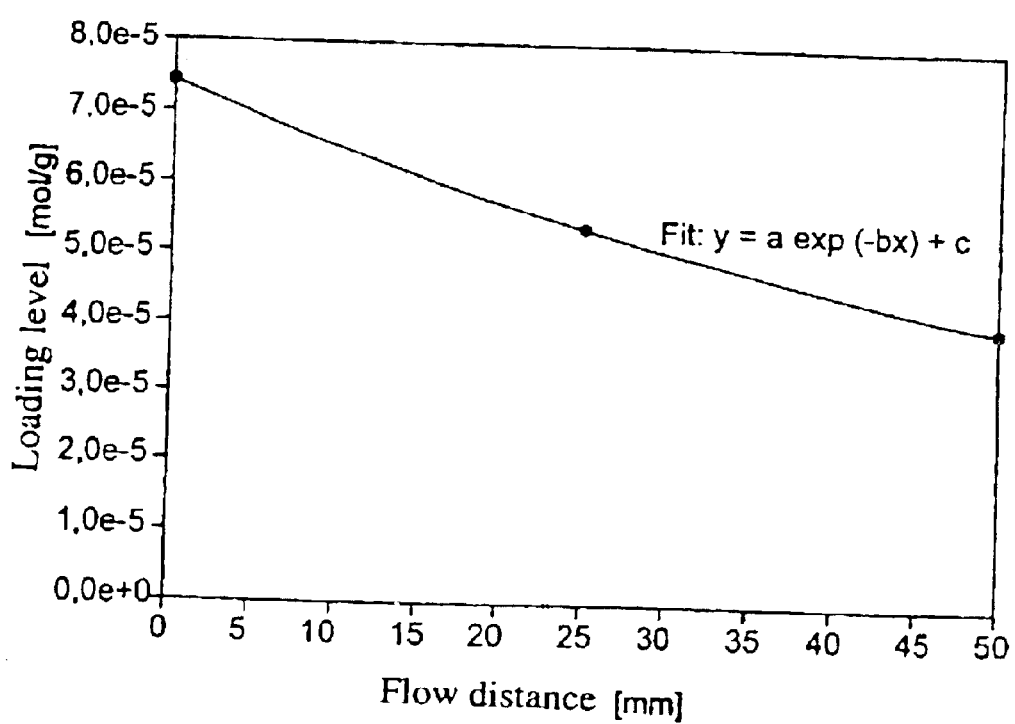
FIG. 2 shows the loading level as a function of flow distance for the supported catalyst of Example 11.

For a function $f(x)=a \exp(-bx)+c$ (where x=flow distance), the coefficients a, b and c which give a curve running through the three above-indicated measured points were determined (FIG. 2). This mathematical relationship between loading level and flow distance for the supported catalyst gave a first moment (arithmetic mean) $\mu_1$=54.8 μmol/g, a standard deviation σ=10.1 μmol/g (18.4% based on $\mu_1$) and a skewness s=0.262.

Example 12

Chemical Drying of Spray-dried $SiO_2$ No. IV 1000 g of spray-dried silica gel (mean particle diameter: 46 mm; specific surface area: 311 m²; pore volume: 1.56 ml/g; baked out for 8 hours at 180° C. under reduced pressure (1 mbar)) were suspended in 5 l of toluene under an $N_2$ atmosphere. At 18° C., 7.75 l (6.83 kg) of 1.53 molar methylaluminoxane solution (in toluene, from Witco) were added over a period of 120 minutes. The mixture was subsequently stirred for 7 h at RT, filtered and the filter cake was washed twice with 2.5 l each time of toluene. The support precursor was then dried under reduced pressure. This gave 1.36 kg of chemically dried precursor.

Example 13

13.1: Preparation of a supported metallocene catalyst according to the present invention A Schlenk frit which had been made inert (diameter: about 2 cm) was charged with 4.9 g of the precursor prepared in Example 12 (pore volume: 1.15 ml/g) (about 5 cm thick layer). In a separate flask, 59 mg (98 mmol) of rac-dimethylsilylenebis(2-ethylbenz[e]indenyl)zirconium dichloride were dissolved in 13 ml of 1.53 molar (based on Al) MAO solution (from Witco: 10% by weight of methylaluminoxane in toluene). After stirring for another 2 hours, the solution was introduced into the Schlenk frit and the initially charged precursor was carefully covered. After the supernatant impregnation solution had run through, the supported catalyst which remained was allowed to stand for 20 hours while being protected from light. $N_2$ was then briefly passed through to push through remaining solution. The colored impregnation solution which ran through here was discarded. The precursor had all been loaded (uniform deep orange color of the supported catalyst). It was washed 3 times with 100 ml each time of pentane and subsequently dried in a stream of $N_2$ (from above). The yield was 5.4 g of supported catalyst (Zr content: 9.8 mmol/g % metallocene utilization: 53.8%).

13.2: Polymerization (1 l autoclave)

Example 2.2 was repeated using 140 mg of supported catalyst from Example 13.1, giving 75 g of polypropylene powder (productivity: 535 g of PP/g of catalyst). Subsequent inspection of the autoclave revealed no deposits or lumps.

Example 14

14.1: Preparation of a supported metallocene catalyst according to the present invention A Schlenk frit which had been made inert (diameter: about 2 cm) was charged with 4.9 g of the precursor prepared in Example 12 (pore volume: 1.15 ml/g) (about 5 cm thick layer). In a separate flask 58 mg (98 mmol) of rac-dimethylsilylenbis(2-methylbenz[e]-tetrahydroindenyl) zirconium dichloride were dissolved in 13 ml of 1.53 molar (based on Al) MAO solution (from Witco: 10% by weight methylaluminoxane in toluene). After stirring for another 2 hours, the solution was introduced into the Schlenk frit and the initially charged precursor was carefully covered. After the supernatant impregnation solution had run through, the supported catalyst which remained was allowed to stand for 20 hours while being protected from light. $N_2$ was then briefly passed through to push through remaining solution. The colored impregnation solution which ran through here was discarded. The precursor had all been loaded (uniform deep orange color of the supported catalyst). It was washed 3 times with 100 ml each time of pentane and was subsequently dried in a stream of $N_2$ (from above). The yield was 5.35 g of supported catalyst (Zr content: 13.2 mmol/g % metallocene utilization: 71.8%).

14.2: Polymerization (1 l autoclave)

Example 2.2 was repeated using 160 mg of supported catalyst from Example 14.1, giving 180 g of polypropylene powder (productivity: 1125 g of PP/g of catalyst). Subsequent inspection of the autoclave revealed no deposits or lumps.

Example 15

15.1: Preparation of a supported metallocene catalyst according to the present invention A Schlenk frit which had been made inert (diameter: about 2 cm) was charged with 4.9 g of the precursor prepared in Example 12 (pore volume: 1.15 ml/g) (about 5 cm thick layer). In a separate flask, 49 mg (98 mmol) of rac-ethylenebis(2,4,7-trimethyl-indenyl)zirconium dichloride were dissolved in 13 ml of 1.53 molar (based on Al) MAO solution (from Witco: 10% by weight of methylaluminoxane in toluene). After stirring for another 2 hours, the solution was introduced into the Schlenk frit and the initially charged precursor was carefully covered. After the supernatant impregnation solution had run through, the supported catalyst which remained was allowed to stand for 20 hours while being protected from light. $N_2$ was then briefly passed through to push through remaining solution. The colored impregnation solution which ran through here was discarded. The precursor had all been loaded (uniform deep orange color of the supported catalyst). It was washed 3 times with 100 ml each time of pentane and subsequently dried in a stream of $N_2$ (from above). The yield was 5.4 g of supported catalyst (Zr content: 16.4 mmol/g % metallocene utilization: 90.6%).

15.2: Polymerization (1 l autoclave)

Example 2.2 was repeated using 160 mg of supported catalyst from Example 15.1, giving 125 g of polypropylene powder (productivity: 781 g of PP/g of catalyst). Subsequent inspection of the autoclave revealed no deposits or lumps.

Example 16

16.1: Preparation of a supported metallocene catalyst according to the present invention A Schlenk frit which had been made inert was charged with 15 g of the precursor prepared in Example 12 (pore volume: 1.15 ml/g). In a separate flask, 230 mg (375 mmol) of rac-dimethylsilylenebis(2-methyl-4-phenyl-1-indenyl) zirconium dichloride were dissolved in 60 ml of 1.53 molar (based on Al) MAO solution (from Witco: 10% by weight of methylaluminoxane in toluene). After stirring for another 2 hours, the solution was introduced into the Schlenk frit and the initially charged precursor was carefully covered. After the supernatant impregnation solution had run through, the supported catalyst which remained was allowed to stand for 20 hours while being protected from light. $N_2$ was then briefly passed through to push through remaining solution. The colored impregnation solution which ran through here was discarded. The precursor had all been loaded (uniform red color of the supported catalyst). It was washed 4 times with about 100 ml each time of pentane and subsequently dried in a stream of $N_2$ (from above). The yield was 16.4 g of supported catalyst (Zr content: 16.4 mmol/g % metallocene utilization: 71.9%).

16.2: Polymerization (10 l autoclave)

30 mmol of triisobutylaluminum (TiBA; 15 ml of a 2 molar solution in heptane) were placed in a dry 10 l autoclave which had been flushed with $N_2$. After addition of 150 mg of Stadis® 450 (Stadis® 450 is a product of DuPont), 3500 g of liquid propene were introduced. Subsequently, 750 mg of the supported metallocene catalyst prepared in Example 16.1 were blown in with $N_2$ via a lock, the autoclave was heated to 605 C and the polymerization was carried out at this temperature. After 90 minutes, the polymerization was stopped by draining the remaining propene and the product was drained through a bottom valve. This gave 1610 g of polypropylene powder without coarse material (productivity: 2150 g of PP/g of catalyst). Subsequent inspection of the autoclave revealed no deposits or lumps.

Example 17

17.1: Preparation of a supported metallocene catalyst according to the present invention (commencement of coapplication series, pure metallocene A))

A Schlenk frit which had been made inert (diameter: about 2 cm) was charged with 7 g of the precursor prepared in Example 12 (pore volume: 1.15 ml/g) . In a separate flask, 81 mg (140 mmol) of rac-dimethylsilylenebis(2-methylbenz [e]indenyl)zirconium dichloride were dissolved in 25 ml of 1.53 molar (based on Al) MAO solution (from Witco: 10% by weight of methylaluminoxane in toluene). After stirring for another 2 hours, the solution was introduced into the Schlenk frit and the initially charged precursor was carefully covered. After the supernatant impregnation solution had run through, the supported catalyst which remained was allowed to stand for 20 hours while being protected from light. $N_2$ was then briefly passed through to push through remaining solution. The colored impregnation solution which ran through here was discarded. The precursor had all been loaded (uniform color of the supported catalyst). It was washed 4 times with about 100 ml each time of pentane and subsequently dried in a stream of $N_2$ (from above). The yield was 7.8 g of supported catalyst (Zr content: 14.3 mmol/g % metallocene utilization: 79.4%).

17.2: Polymerization (10 l autoclave)

30 mmol of triisobutylaluminum (TiBA; 15 ml of a 2 molar solution in heptane) were placed in a dry 10 l autoclave which had been flushed with $N_2$. After addition of 150 mg of Stadis® 450 (Stadis® 450 is a product of DuPont), 3500 g of liquid propene were introduced. Subsequently, 1000 mg of the supported metallocene catalyst prepared in Example 17.1 were blown in with $N_2$ via a lock, the autoclave was heated to 605 C and the polymerization was carried out at this temperature. After 90 minutes, the polymerization was stopped by draining the remaining propene and the product was drained through a bottom valve. This gave 2200 g of polypropylene powder without coarse material (productivity: 2200 g of PP/g of catalyst).

Polymer data: $M_n$=163,000 g/mol; $M_w$=291,000 g/mol; $M_w/M_n$=1.79; $T_m$=145.55 C

Example 18

18.1: Preparation of a supported metallocene catalyst according to the present invention (two different metallocenes, coapplication, metallocene ratio No. 1)

A Schlenk frit which had been made inert (diameter: about 2 cm) was charged with 7 g of the precursor prepared in Example 12 (pore volume: 1.15 ml/g). In a separate flask, 65 mg (113 mmol) of rac-dimethylsilylenebis(2-methylbenz[e]indenyl)zirconium dichloride and 18 mg (29 mmol) of rac-dimethylsilylenebis-(2-methyl-4-phenyl-1-indenyl)zirconium dichloride were dissolved in 25 ml of 1.53 molar (based on Al) MAO solution (from Witco: 10% by weight of methylaluminoxane in toluene). After stirring for another 2 hours, the solution was introduced into the Schlenk frit and the initially charged precursor was carefully covered. After the supernatant impregnation solution had run through, the supported catalyst which remained was allowed to stand for 20 hours while being protected from light. $N_2$ was then briefly passed through to push through remaining solution. The colored impregnation solution which ran through here was discarded. The precursor had all been loaded (uniform color of the supported catalyst). It was washed 4 times with about 100 ml each time of pentane and subsequently dried in a stream of $N_2$ (from above). The yield was 7.8 g of supported catalyst (Zr content: 16.4 mmol/g % metallocene utilization: 90.3%).

18.2: Polymerization (10 l autoclave)

30 mmol of triisobutylaluminum (TiBA; 15 ml of a 2 molar solution in heptane) were placed in a dry 10 l autoclave which had been flushed with $N_2$. After addition of 150 mg of Stadis® 450 (Stadis® 450 is a product of DuPont), 3500 g of liquid propene were introduced. Subsequently, 1100 mg of the supported metallocene catalyst prepared in Example 18.1 were blown in with $N_2$ via a lock, the autoclave was heated to 605 C and the polymerization was carried out at this temperature. After 90 minutes, the polymerization was stopped by draining the remaining propene and the product was drained through a bottom valve. This gave 1400 g of polypropylene powder without coarse material (productivity: 1270 g of PP/g of catalyst).

Polymer data: $M_n$=169,000 g/mol; $M_w$=337,000 g/mol; $M_w/M_n$=1.99; $T_m$=146.25 C

Example 19

19.1: Preparation of a supported metallocene catalyst according to the present invention (coapplication, metallocene ratio No. 2)

A Schlenk frit which had been made inert (diameter: about 2 cm) was charged with about 8.9 g of the precursor prepared in Example 12 (pore volume: 1.15 ml/g). In a separate flask, 62 mg (107 mmol) of rac-dimethylsilylenebis(2-methylbenz[e]indenyl)zirconium dichloride and 45 mg (72 mmol) of rac-dimethylsilylenebis(2-methyl-4-phenyl-1-indenyl)zirconium dichloride were dissolved in 32 ml of 1.53 molar (based on Al) MAO solution (from Witco: 10% by weight of methylaluminoxane in toluene). After stirring for another 2 hours, the solution was introduced into the Schlenk frit and the initially charged precursor was carefully covered. After about 1 hour, the filtrate which had run through was returned to the top of the frit and the contents of the frit were briefly stirred. After the impregnation solution had again run through, the supported catalyst which remained was allowed to stand for 20 hours while being protected from light. $N_2$ was then briefly passed through to push through remaining solution. The colored impregnation solution which ran through here was discarded. The precursor had all been loaded (uniform color of the supported catalyst). It was washed 4 times with about 100 ml each time of pentane and subsequently dried in a stream of $N_2$ (from above). The yield was 9.8 g of supported catalyst (Zr content: 14.3 mmol/g % metallocene utilization: 78%).

19.2: Polymerization (10 l autoclave)

30 mmol of triisobutylaluminum (TiBA; 15 ml of a 2 molar solution in heptane) were placed in a dry 10 l autoclave which had been flushed with $N_2$. After addition of 150 mg of Stadis® 450 (Stadis® 450 is a product of DuPont), 3500 g of liquid propene were introduced. Subsequently, 710 mg of the supported metallocene catalyst prepared in Example 19.1 were blown in with $N_2$ via a lock, the autoclave was heated to 605 C and the polymerization was carried out at this temperature. After 90 minutes, the polymerization was stopped by draining the remaining propene and the product was drained through a bottom valve. This gave 1000 g of polypropylene powder without coarse material (productivity: 1400 g of PP/g of catalyst).

Polymer data: $M_n$=192,000 g/mol; $M_w$=490,000 g/mol; $M_w/M_n$=2.55; $T_m$=147.05 C

Example 20

20.1: Preparation of a supported metallocene catalyst according to the present invention (coapplication, metallocene ratio No. 3)

A Schlenk frit which had been made inert (diameter: about 2 cm) was charged with 7 g of the precursor prepared in Example 12 (pore volume: 1.15 ml/g). In a separate flask, 32 mg (55 mmol) of rac-dimethylsilylenebis(2-methylbenz[e]indenyl)zirconium dichloride and 54 mg (86 mmol) of rac-dimethylsilylenebis(2-methyl-4-phenyl-1-indenyl)zirconium dichloride were dissolved in 25 ml of 1.53 molar (based on Al) MAO solution (from Witco: 10% by weight of methylaluminoxane in toluene). After stirring for another 2 hours, the solution was introduced into the Schlenk frit and the initially charged precursor was carefully covered. After about 1 hour, the filtrate which had run through was returned to the top of the frit and the contents of the frit were briefly stirred. After the impregnation solution had again run through, the supported catalyst which remained was allowed to stand for 20 hours while being protected from light. $N_2$ was then briefly passed through to push through remaining solution. The colored impregnation solution which ran through here was discarded. The precursor had all been loaded (uniform color of the supported catalyst). It was washed 4 times with about 100 ml each time of pentane and subsequently dried in a stream of $N_2$ (from above). The yield was 7.7 g of supported catalyst (Zr content; 14.3 mmol/g % metallocene utilization: 78%).

20.2: Polymerization (10 l autoclave)

30 mmol of triisobutylaluminum (TiBA; 15 ml of a 2 molar solution in heptane) were placed in a dry 10 l autoclave which had been flushed with $N_2$. After addition of 150 mg of Stadis® 450 (Stadis® 450 is a product of DuPont), 3500 g of liquid propene were introduced. Subsequently, 660 mg of the supported metallocene catalyst prepared in Example 20.1 were blown in with $N_2$ via a lock, the autoclave was heated to 605 C and the polymerization was carried out at this temperature. After 90 minutes, the polymerization was stopped by draining the remaining propene and the product was drained through a bottom valve. This gave 960 g of polypropylene powder without coarse material (productivity: 1450 g of PP/g of catalyst).

Polymer data: $M_n$=225,000 g/mol; $M_w$=646,000 g/mol; $M_w/M_n$=2.88; $T_m$=147.65 C

Example 21

21.1: Preparation of a supported metallocene catalyst according to the present invention (coapplication, metallocene ratio No. 4)

A Schlenk frit which had been made inert (diameter: about 2 cm) was charged with 7 g of the precursor prepared in Example 12 (pore volume: 1.15 ml/g). In a separate flask, 16 mg (28 mmol) of rac-dimethylsilylenebis(2-methylbenz[e]indenyl)zirconium dichloride and 70 mg (111 mmol) of rac-dimethylsilylenebis(2-methyl-4-phenyl-1-indenyl)zirconium dichloride were dissolved in 30 ml of 1.53 molar (based on Al) MAO solution (from Witco: 10% by weight of methylaluminoxane in toluene). After stirring for another 2 hours, the solution was introduced into the Schlenk frit and the initially charged precursor was carefully covered. After about 1 hour, the filtrate which had run through was returned to the top of the frit and the contents of the frit were briefly stirred. After the impregnation solution had again run through, the supported catalyst which remained was allowed to stand for 20 hours while being protected from light. $N_2$ was then briefly passed through to push through remaining solution. The colored impregnation solution which ran through here was discarded. The precursor had all been loaded (uniform color of the supported catalyst). It was washed 4 times with about 100 ml each time of pentane and subsequently dried in a stream of $N_2$ (from above) . The yield was 7.8 g of supported catalyst (Zr content: 13.2 mmol/g % metallocene utilization: 74%).

21.2: Polymerization (10 1 autoclave)

30 mmol of triisobutylaluminum (TiBA; 15 ml of a 2 molar solution in heptane) were placed in a dry 10 1 autoclave which had been flushed with $N_2$. After addition of 150 mg of Stadis® 450 (Stadis® 450 is a product of DuPont), 3500 g of liquid propene were introduced. Subsequently, 670 mg of the supported metallocene catalyst prepared in Example 21.1 were blown in with $N_2$ via a lock, the autoclave was heated to 605 C and the polymerization was carried out at this temperature. After 90 minutes, the polymerization was stopped by draining the remaining propene and the product was drained through a bottom valve. This gave 1000 g of polypropylene powder without coarse material (productivity: 1500 g of PP/g of catalyst).

Polymer data: $M_n$=237,000 g/mol; $M_w$=720,000 g/mol; $M_w/M_n$=3.04; $T_m$=148.05 C

Example 22

22.1: Preparation of a supported metallocene catalyst according to the present invention (end of the coapplication series, pure metallocene B)

A Schlenk frit which had been made inert (diameter: about 2 cm) was charged with 7 g of the precursor prepared in Example 12 (pore volume: 1.15 ml/g) . In a separate flask, 88 mg (140 mmol) of rac-dimethylsilylenebis(2-methyl-4-phenyl-1-indenyl)zirconium dichloride were dissolved in 30 ml of 1.53 molar (based on Al) MAO solution (from Witco: 10% by weight of methylaluminoxane in toluene). After stirring for another 2 hours, the solution was introduced into the Schlenk frit and the initially charged precursor was carefully covered. After about 1 hour, the filtrate which had run through was returned to the top of the frit and the contents of the frit were briefly stirred. After the impregnation solution had again run through, the supported catalyst which remained was allowed to stand for 20 hours while being protected from light. $N_2$ was then briefly passed through to push through remaining solution. The colored impregnation solution which ran through here was discarded. The precursor had all been loaded (uniform color of the supported catalyst). It was washed 4 times with about 100 ml each time of pentane and subsequently dried in a stream of $N_2$ (from above). The yield was 7.8 g of supported catalyst (Zr content: 13.2 mmol/g % metallocene utilization: 74%).

22.2: Polymerization (10 1 autoclave)

30 mmol of triisobutylaluminum (TiBA; 15 ml of a 2 molar solution in heptane) were placed in a dry 10 1 autoclave which had been flushed with $N_2$. After addition of 150 mg of Stadis® 450 (Stadis® 450 is a product of DuPont), 3500 g of liquid propene were introduced. Subsequently, 740 mg of the supported metallocene catalyst prepared in Example 22.1 were blown in with $N_2$ via a lock, the autoclave was heated to 605 C and the polymerization was carried out at this temperature. After 90 minutes, the polymerization was stopped by draining the remaining propene and the product was drained through a bottom valve. This gave 610 g of polypropylene powder without coarse material (productivity: 820 g of PP/g of catalyst).

Polymer data: $M_n$=408,000 g/mol; $M_w$=1,178,000 g/mol; $M_w/M_n$=2.89; $T_m$=149.35 C

Example 23

Chemical Drying of $SiO_2$ (Large Scale)

20.1 kg of spray-dried silica gel (mean particle diameter; 46 mm; specific surface area; 311 $m^2$; pore volume: 1.56 ml/g; baked out for 8 hours at 130° C. under reduced pressure (30 mbar)) were placed in a dry 300 1 process filter which had been flushed with $N_2$ and were suspended in 75 1 of toluene. 124 kg of 1.53 molar (based on Al) MAO solution (from Witco: 10% by weight of methylaluminoxane in toluene) were subsequently metered in over a period of 2 hours at such a rate that the internal temperature did not exceed 355 C. After addition was complete, the suspension was stirred overnight at RT, for which purpose the process filter was rotated through 1805.

On the next day, solvent and unreacted MAO were removed by filtration under $N_2$ pressure and the solid which remained was washed once with 60 1 of toluene. The mixture was subsequently filtered again and the chemically dried silica gel was dried in a stream of $N_2$ for 16 hours at an internal temperature of 35–405.

Example 24

24.1: Preparation of a supported metallocene catalyst according to the present invention 0.98 kg (1.7 mol) of rac-dimethylsilylenebis(2-methylbenz[e]indenyl)zirconium dichloride was placed in a dry 300 1 stirred vessel which had been flushed with $N_2$ and was dissolved at RT in 124 kg of 1.53 molar (based on Al) MAO solution (from Witco: 10% by weight of methylaluminoxane in toluene). Two thirds of the solution obtained in this way were sprayed, over a period of 3 hours, onto the chemically dried silica gel in the process filter with as level a surface as possible. During this procedure, the outlet of the process filter remained open. The last third of the impregnation solution was not sprayed on, but added directly from above to the supernatant impregnation solution without stirring up the support in the process filter. After the impregnation solution had all been added, the outlet was closed, the contents were stirred for 15 minutes and then allowed to stand overnight. The next day, the outlet was opened again and the remaining impregnation solution was removed by filtration, firstly without application of pressure, then toward the end under a slight $N_2$ pressure. 60 l of pentane were sprayed onto the solid which remained and the mixture was stirred for 1 hour. After filtration, the solid was washed twice with 60 l each time of pentane and the supported catalyst which remained was then dried in a stream of $N_2$ (2 hours at an internal temperature of 35–405 C with very slow stirring). The yield was 34.8 kg of suported metallocene catalyst (Zr content: 36.2 mmol/g % metallocene utilization: 74%).

24.2: Polymerization in a continuous gas-phase process

The supported metallocene catalyst prepared in Example 24.1 was used for the continuous homopolymerization of propene in a vertically mixed 800 l gas-phase reactor. The reactor contained a bed of finely divided polymer and was operated at a constant output of 100 kg/h. The reactor pressure was 24 bar and the reactor temperature was 635 C. As cleaning alkyl, 300 mmol/h of triisobutylaluminum were fed in (1 molar solution in heptane). In addition, 18.8 l/h of $H_2$ were metered in. This gave a polymer powder having a bulk density of 470 g/l, a mean particle size of $d_{avg.}$=1.4 mm and 5.7% by weight of particles having a diameter d>2 mm (polymer data: $T_m$: 147.75 C, [h]: 1.36 dl/g, MFI: 33.5 g/10 min, $X_s$: 0.5% by weight). The catalyst productivity was 5.7 kg of PP/g of catalyst.

Example C 1 demonstrates that it is not possible to obtain a catalyst which has all been loaded when the volume of the impregnation solution is too small.

Examples C 2 and C 3 demonstrate that the process described in WO 94/28034 gives usable catalysts only at a low loading.

Example C 4 demonstrates that when the impregnation solution volume is restricted to the available pore volume, high loadings cannot be achieved and the resulting supported catalyst also has a comparatively low productivity.

Comparison of Examples 9 and C 6 demonstrates the better economics of the novel process compared to that described in EP 295312 and WO 98/01481.

Example 7 demonstrates the recyclability of the used impregnation solution.

Examples 10 and 11 demonstrate the different loading of various catalyst particles and the ability to influence the variance of the loading level distribution.

Examples 13–16 demonstrate the universal applicability of the process described.

Examples 17–22 demonstrate the suitability of the process described for the coapplication of different metallocenes to a support.

We claim:

1. A process for preparing a metal-containing supported catalyst for polymerization processes or a metal-containing supported catalyst component for polymerization processes supported on a particulate support material composed of individual support particles having a different loading level of the individual support particles, the loading level being the concentration of a metal in the individual support particles by impregnation of a support material with an impregnation solution comprising the metal component, wherein the impregnation solution flows in a directed stream between and through the support material and the volume of the impregnation solution is at least 1.5 times the pore volume of the support.

2. The process of claim 1, wherein the metal component is a transition metal compound.

3. The process of claim 1, wherein the metal component is an organometallic compound of a transition metal.

4. The process of claim 1, wherein the metal component is a metallocene compound.

5. The process of claim 1, wherein the support material is an inorganic compound.

6. The process of claim 1, wherein the volume of the impregnation solution is greater than three times the pore volume of the support material used.

7. The process of claim 1, wherein the individual particles of support material are virtually at rest while the impregnation solution flows between and through them.

8. The metal-containing supported catalyst obtained by the process of claim 1.

9. A process for preparing polymers based on monomers having a C-C double bond and/or a C-C triple bond comprising polymerizing these monomers in the presence of a metal-containing supported catalyst or a metal-containing supported catalyst component obtained by the process of claim 1.

10. The process of claim 1 wherein the individual support particles have an asymmetric loading level distribution.

11. The process of claim 1, wherein the loading level distribution has a standard deviation, a 1st moment and a skewness s, the standard deviation being at least 1% of the 1st moment and the skewness s which meets the conditions $s^2 \geq 0.0001$.

12. The process of claim 10, wherein the loading level distribution has a standard deviation, a 1st moment and a skewness s, the standard deviation being at least 1% of the 1st moment and the skewness s which meets the conditions $s^2 \geq 0.0001$.

13. The process of claim 11, wherein the skewness s meets the conditions $s^2 \geq 0.01$.

14. The process of claim 12, wherein the skewness s meets the conditions $s^2 \geq +0.01$.

15. The process of claim 1, which is carried out in a cylindrical reaction vessel with inlet and outlet devices.

* * * * *